United States Patent Office 3,751,466
Patented Aug. 7, 1973

3,751,466
N-BENZYLIDENE ALKYLAMINES
Raphael Menasse and Karl Gatzi, Basel, Switzerland, assignors to Ciba-Geigy Corporation, Ardsley, N.Y.
No Drawing. Continuation-in-part of application Ser. No. 708,807, Feb. 28, 1968, which is a continuation-in-part of application Ser. No. 512,811, Dec. 9, 1965, now abandoned. This application Oct. 12, 1970, Ser. No. 80,148
Int. Cl. C07c *119/00*
U.S. Cl. 260—566 F  3 Claims

ABSTRACT OF THE DISCLOSURE

N-benzylidene alkylamines in which the alkyl group has from 8 to 18 carbon atoms, and in which the phenyl moiety is optionally substituted, are fungicidal agents. Compositions containing these compounds are fungicides and methods for combatting fungi use these compounds.

CROSS REFERENCE TO RELATED APPLICATIONS

This application is a continuation-in-part of our pending patent application Ser. No. 708,807, filed Feb. 28, 1968 which in turn is a continuation-in-part of our application Ser. No. 512,811, both now abandoned.

DETAILED DISCLOSURE

The present invention concerns new N-benzylidene alkylamines which are useful for combatting fungi, especially phytopathogenic fungi, on the one hand and for protecting organic materials from attack by noxious fungi, on the other hand.

It has been found that N-benzylidene alkylamine compounds of the formula

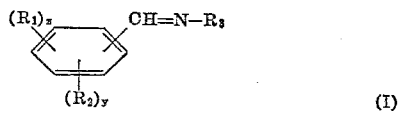

(I)

wherein $R_1$ represents hydrogen, a halogen atom, or a hydroxyl group,
$R_2$ represents a cyano group, an alkyl, alkylamino, dialkylamino, alkoxy, dialkylaminoalkoxy, alkylthio or alkoxycarbonyl radical having preferably from 1 to 4 carbon atoms in the alkyl moieties, of the last six substituents mentioned,
$R_3$ represents an alkyl or alkenyl radical having from 8 to 18 carbon atoms,
$x$ represents an integer from 1 to 3, and
$y$ represents an integer from 1 to 2 are excellently suitable for combatting phytopathogenic fungi and for the protection of living plants and parts of plants from attack by such fungi.

For combatting phytopathogenic fungi and for protecting living plants and parts thereof from attack by such fungi and taking into account the type of crop to be protected, e.g. planted fields or groves of fruit trees, etc. as well as differences in regional climatic conditions, application of from about 1000 to 2000 liters of a liquid sprayable composition having a content of 0.1% of an active compound according to the invention, per hectare, or proportionally lesser amounts in case compositions such as powders having higher concentrations of active substances are used in field crops, and about 10 to 50 liters of the liquid, sprayable compositions having the said content of active substance or correspondingly lesser amounts of the preferably used powders, if these are of higher concentrations, may be required for a fullgrown fruit tree of average size.

The active substances of the general Formula I contained in the new agents are effective against numerous phytopathogenic fungi. For this reason these agents are used for the protection of living plants and living parts thereof such as blossoms, seeds, fruit, roots, stems and foliage from attack by fungi and for combatting fungi on these parts of the plants. The active substances are also systemic fungicides and it is due to this property that the treated plants are given a longer lasting and more extensive protection from attack by fungi. There are no phytotoxic effects when the new agents are so used in plant protection that the concentration of active substance ranges between 0.01 and 2% by weight calculated on the weight of agent.

As seed dressing, the new fungicidal agents afford good protection to the treated seeds, in particular from attack by *Tilletia tritici* and *Fusarium culmorum*. There is no inhibition of germination. In the protection of crops, particularly satisfactory results are obtained in the control of powdery mildew.

The fungicidal agents are produced by methods known per se by intimately mixing and milling the active substances of general Formula I with suitable carriers, optionally with the addition of dispersing agents or solvents which are inert to the active substances. The fungicidal N-benzylidene and alkylamines of the general Formula I can be used in plant protection in the following forms:

Solid forms: Dusts, sprinkling agents, granulates (coated granulates, impregnated granulates, homogeneous granulates);
Water dispersible concentrates of active substance: Wettable powders, pastes, emulsions;
Liquid forms: Solutions.

To produce the solid forms for use (dusts and sprinkling agents, granulates), the active substances are mixed with solid carriers. Examples of such carriers are kaolin, steatite, bole, loess, chalk, limestone, ataclay, dolomite, stone powder, ground silica waste, feldspar, mica, calcium and magnesium sulfates, milled synthetic plastics, fertilisers such as ammonium sulfate, ammonium phosphates, ammonium nitrate, urea, ground vegetable products such as bran, bark dust, sawdust, ground nutshells, or lignin. These carriers can be used alone or admixed with each other.

The particle size of the carriers is, for dusts up to about 100/$\mu$, for sprinkling agents from about 75/$\mu$ to 0.2 mm. and for granulates about 0.2 mm.

As a general rule, the concentrations of active substances in the solid preparations are from 0.5 to 80% by weight.

To these mixtures can also be added additives which stabilise the active substance and/or commercially available non-ionic, anionic and cationic surfactants which, for example, improve the adhesion of the active substances on plants and parts of plants (glues, adhesives) and/or attain better wettability (wetting agents) and dispersibility (dispersing agents) of the active substances.

The concentrates of active substances which can be dispersed in water, i.e. wettable powders, pastes and emulsion concentrates, are agents which can be diluted with water to any concentration desired. They consist of active substance, carrier, optionally additives which stabilise the active substance, surface active substance and antifoam agents and, optionally, solvents. The concentration of active substance in these agents is 5 to 80% weight per volume.

Wettable powders and pastes are obtained by mixing and milling the active substances with dispersing agents and pulverulent carriers in suitable mixers and milling machines until homogeneity is attained. Carriers are, for example those mentioned in the paragraph dealing with solid forms for application. In some cases it is advantageous to use mixtures of different carriers. As dispersing agents commercially available surface active compounds can be used.

Examples of anti-foam agents are, e.g. silicones "Antifoam A" etc.

The active substances are so mixed, milled, sieved and strained with the additives mentioned above that the solid particle size in wettable powders and in pastes is not more than 20 to 40μ and 3μ respectively. To produce emulsion concentrates and pastes, dispersing agents, organic solvents and water are used. Examples of solvents are as follows: alcohols, benzene, xylenes, toluene, dimethyl sulphoxide, dimethyl formamide and mineral oil fractions boiling within the range of 120 to 350°

The solvents must be almost without smell, not phytotoxic and inert to the active substances.

In addition, the agents according to the invention can be used in the form of solutions. For this purpose, the active substance or several active substances of general Formula I is/are dissolved in suitable organic solvents, mixtures of solvents or in water. Aliphatic and aromatic hydrocarbons, their chlorinated derivatives, alkyl naphthalenes either alone or admixed with each other can be used as organic solvents. The solutions should contain the active substances in a concentration range from 1 to 20% weight per volume.

The agents according to the invention can be admixed with other biocidal active substances or agents. Thus, to broaden the range of action, the new agents can contain, in addition to the compounds of general Formula I mentioned, e.g. insecticides, other fungicides, bactericides, fungistatica, bacteriostatica or nematicides. The agents according to the invention can also contain fertilizers, trace elements etc.

The compounds of Formula I are distinguished by especially strong fungicidal activity, and by particularly low phytotoxicity.

Where not expressly stated otherwise, wherever "alkyl" and "alkoxy" appear in the definitions of substituents lower alkyl and lower alkoxy, i.e. with from 1 to 4 carbon atoms, are preferred.

The above-mentioned compounds are obtained in a known manner by reacting a corresponding substituted benzaldehyde of the formula

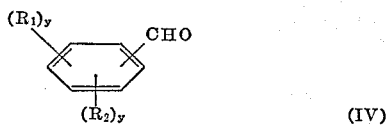

(IV)

with a corresponding amine of the formula $$H_2NR_3 \quad (V)$$

wherein $R_1$, $R_2$, $R_3$, $x$ and $y$ have the meanings given above.

The following non-limitative examples serve to illustrate the preparation of the new compounds of Formula II; parts and percentages are given therein by weight, unless expressly stated otherwise, and degrees are given in centigrade; 1 torr is practically equal to 1 mm. Hg.

Example 1

14.0 grams (0.1 mol) of 4-chlorobenzaldehyde and 18.5 grams (0.1 mol) of n-dodecylamine are mixed together in 100 milliliters of benzene. The reaction mixture is heated to distill off the water of reaction of a benzene-water azeotrope. The heating is continued until no more water distill. The remaining solvent and excess amine are then removed by distillation and an N-(4-methoxybenzylidene)-dodecylamine product recovered as residue. The crude residue is redistilled at 160° and 0.1 torr and the pure product recovered.

Example 2

17.5 grams (0.1 mole) of 2,4-dichlorobenzaldehyde and 21.3 (0.1 mole) of tetradecylamine are mixed together in 100 milliliters of benzene. The reaction mixture is heated to distill off the water of reaction as a benzene-water azeotrope. The heating is continued until no more water distills. The remaining solvent and excess amine are then removed by distillation and an N-(4-dimethylaminobenzylidene)-tetradecylamine product recovered as residue. The product recrystallized from isopropyl alcohol has a melting point of 51° C.

As active compounds for fungicidal agents according to the invention, the following compounds of the general Formula I may be used; which are produced in an analogous manner by the procedure described in Examples 1 and 2.

N-(4-methylbenzylidene)-decylamine—
 B.P. 120° C./0.05 torr
N-(4-methylbenzylidene)-dodecylamine—
 B.P. 145° C./0.05 torr
N-(3,5-diisopropyl-4-hydroxybenzylidene)-octylamine—
 B.P. 164–166° C./0.04 torr
N-(3,5-diisopropyl-4-hydroxybenzylidene)-decylamine—
 B.P. 175–180° C./0.01 torr
N-(3,5-diisopropyl-4-hydroxybenzylidene)-dodecylamine—B.P. 192–195° C./0.01 torr
N-(4-dimethylamino-benzylidene)-octylamine—
 B.P. 130° C./0.01 torr
N-(4-dimethylamino-benzylidene)-decylamine—
 M.P. 27° C.
N-(4-dimethylamino-benzylidene)-dodecylamine—
 B.P. 181° C./0.005 torr
N-(4-dimethylamino-benzylidene)-octadecylamine—
 M.P. 58° C.
N-(2-chloro-4-dimethylamino-benzylidene)-octylamine—B.P. 154° C./0.01 torr
N-(2-chloro-4-dimethylamino-benzylidene)-dodecylamine—M.P. 37° C.
N-(4-methoxybenzylidene)-octylamine—
 B.P. 105° C./0.005 torr
N-(4-methoxybenzylidene)-decylamine—
 B.P. 130° C./0.01 torr
N-(4-hydroxybenzylidene)-octylamine—M.P. 72° C.
N-(4-methoxybenzylidene)-tetradecylamine—
 B.P. 170° C./0.01 torr
N-[4-(β-dimethylamino-ethoxy)benzylidene]-
 decylamine—B. P. 157° C./0.01 torr
N-[4-(β-dimethylamino-ethoxy)-benzylidene]-
 dodecylamine—B.P. 176° C./0.01 torr
N-[4-(β-dimethylamino-ethoxy)-benzylidene]-
 decylamine—B.P. 163° C./0.01 torr
N-[4-(β-dimethylamino-ethoxy)-benzylidene]-
 dodecylamine—B.P. 195° C./0.01 torr
N-(4-cyanobenzylidene)-octylamine
N-(4-cyanobenzylidene)-decylamine
N-(4-cyanobenzylidene)-dodecylamine
N-(4-methylthio-benzylidene)-octylamine
N-(4-t-butylthio-benzylidene)-decylamine
N-(4-n-propylthio-benzylidene)-dodecylamine—
 B.P. 138/0.02 torr
N-(3,5-di-tert.butyl-4-hydroxybenzylidene)-
 octylamine—M.P. 105–108° C.
N-(3,5-di-tert.butyl-4-hydroxybenzylidene)-
 decylamine—B.P. 165° C./0.05 torr
N-(3,5-di-tert.butyl-4-hydroxybenzylidene)-
 dodecylamine—M.P. 81°
N-(4-hydroxy-benzylidene)-oleylamine—M.P. 87–88°
N-(4-ethylamino-benzylidene)-myristylamine
N-(4-isopropyl-benzylidene)octylamine—
 B.P. 115°/0.04 torr
N-(4-methoxycarbonyl-benzylidene)-dodecylamine—
 B.P. 168°/0.02 torr
N-(4-bromo-benzylidene)-dodecylamine
N-(3-fluoro-benzylidene)-octylamine N-(2,4-dimethoxy-benzylidene)-octylamine
N-(2-chloro-4-dimethylamino-benzylidene)-decylamine
N-(4-hydroxy-3-methoxycarbonyl-benzylidene)-
 dodecylamine
N-[3,5-bis(methoxycarbonyl)-benzylidene]-octylamine
N-[1,4-bis-(methoxycarbonyl)-benz-2-ylidene]-
 octylamine

Example 3

To produce (a) a 10% and (b) a 2% dust, the following components are used:

(a)

10 parts of N-(4-methoxybenzylidene)-dodecylamine
5 parts of highly dispersed silicic acid
85 parts of stone powder (b)

2 parts of N-(4-dimethylaminobenzylidene)-octylamine
1 part of highly dispersed silicic acid
97 parts of kaolin The active substances mentioned above are intimately mixed and milled with the carriers. The fungicidal dusts so obtained serve for the treatment of seed beds, or for dusting plants.

Example 4

The following components are used to produce (a) a 10% and (b) a 60% seed dressing:

(a)

10 parts of N-(4-isopropylbenzylidene)-octylamine
5 parts of kieselghur
1 part of liquid paraffin
84 parts of ground steatite (b)

60 parts of N-(4-methoxybenzylidene)-dodecylamine
15 parts of kieselguhr
1 part of liquid paraffin
24 parts of ground steatite The active substances mentioned are intimately mixed in a mixer with the above listed carriers and the paraffin as dispersing agent and then the mixture is milled. The pulverulent seed dressings obtained serve for the treatment of all types of seeds.

Example 5

To produce (a) a 2% and (b) a 5% granulate, the following components are used:

(a)

2 parts of N-(4-methoxybenzylidene)-dodecylamine
3 parts of calcium silicate
92 parts of ground limestone (0.4–0.8 mm. diameter)
3 parts of spindle oil (b)

5 parts of N-(4-dimethylaminobenzylidene)-dodecylamine
6 parts of calcium silicate
88 parts of ground limestone (0.4–0.8 mm. diameter)
1 part of cetyl polyglycol ether.

The ground limestone is impregnated with either the spindle oil or the cetyl polyglycol ether and then mixed with a mixture of the active substance mentioned and the calcium silicate.

(c)

10% granulate 10 parts of N-[4-(β-diethylamino-ethoxy)-benzylidene]-
 dodecylamine
8 parts of calcium silicate
82 parts of ground limestone The above active substance is milled several times and mixed with the carriers.

This granulate is particularly suitable for the disinfection of seed beds.

Example 6

To produce (a) and (b) 25%, and (c) 40%, wettable powders, the following components are used:

(a)

25 parts of N-(4-methoxybenzylidene)-tetradecylamine
10 parts of kaolin
54 parts of silicic acid
5 parts of calcium-lignin sulphonate
1 part of polyvinyl alcohol (50%)
5 parts of dibutyl naphthalene sulphonic acid (Na salt)

(b)

25 parts of N-(4-dimethylaminobenzylidene)-octylamine
55 parts of kaolin
10 parts of highly dispersed silicic acid
5 parts of dibutyl naphthalene sulphonic acid (Na salt)
5 parts of calcium-lignin sulphonate (c)

40 parts of N-(4-dimethylaminobenzylidene)-octylamine
40 parts of calcium silicate
8 parts of kaolin
3 parts of dibutyl naphthalene sulphonic acid (Na salt)
4 parts of cetyl polyglycol ether
5 parts of calcium-lignin sulphonate.

The above active substances are mixed and finely milled with the carriers and dispersing agents given. Wettable powders of excellent wettability and suspendability are obtained which, with water, while forming suspensions, can be diluted to any concentration desired. Such suspensions are suitable for the treatment of cultivated plants.

Example 7

To produce (a) a 25% and (b) a 50% emulsion concentrate, the following components are used:

(a)

25 parts of N-(4-methoxybenzylidene)-tetradecylamine
45 parts of xylene
20 parts of diacetonyl alcohol
10 parts of a combination emulsifying agent consisting of alkylaryl polyethylene glycol and the Ca salt of an alkyaryl sulphonate (e.g. Emullat P 140 HFP; Union Chimique Belge S.A. Brussels).

(b)

50 parts of N-(2,5-diisopropyl-4-hydroxybenzylidene)-
 decylamine
30 parts of xylene
10 parts of diacetonyl alcohol
10 parts of a combination emulsifying agent consisting of alkylaryl polyethylene glycol and the Ca salt of an alkyaryl sulphonate (e.g. Emullat P 140 HFP; Union Chimique Belge S.A. Brussels).

Each active substance is dissolved in the mixture of the above indicated parts of xylene and diacetonyl alcohol. The combination emulsifying agent is then added to this solution. A 25% or 50% emulsion concentrate is obtained which can be diluted with water to any concentration desired. Such emulsions are suitable for the treatment of cultivated plants.

The fungicidal activity of the active substances of the general Formula I was determined by a spore germination test with spores of the following types of fungi:

*Alternaria tenuis*
*Botrytis cinerea*
*Clasterosporium c.*
*Coniothyrium dipl.*
*Fusarium culmorum*
*Mucor spec.*
*Penicillium spec.*
*Stemphylium cons.*

1 ml. of a 1%, 0.1% and 0.01% acetone solution of the active substance is placed on 2 glass slides (26 x 76 mm.) under identical conditions. The solvent is evaporated and a uniform coating of active substance is obtained on the glass slides. The slides are inoculated with fungi spores and then kept in dishes at room temperature in an atmosphere which is almost satured with steam. After 2–3 and 4–6 days, the germinated spores are counted.

The results are summarized in the following table:

+ means an at least 90% inhibition of germination effected by the residue of 1 ml. of a 1% acetone solution of active substance, ++ means the same effect attained by the residue of 1 ml. of a 0.1% acetone solution of active substance, +++ means the same effect attained by the residue of 1 ml. of a 0.01% acetone solution of active substance, — means no inhibition of germination with the concentrations of active substance given above.

We claim:
1. A compound of the formula

wherein $R_3$ is an alkyl radical having from 8 to 18 carbons.

2. A compound as defined in claim 1 which is of the formula

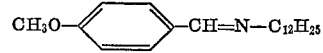

| Active substance | Alt. ten. | Botr. cin. | Clast. c. | Coni. dipl. | Fus. culm. | Muc. spec. | Penic. spec. | Stemph. cons. |
|---|---|---|---|---|---|---|---|---|
| N-(4-methoxybenzylidene)-dodecylamine | +++ | +++ | +++ | +++ | +++ | +++ | +++ | +++ |
| N-(4-methoxybenzylidene)-tetradecylamine | ++ | ++ | ++ | ++ | ++ | ++ | ++ | ++ |
| N-(4-dimethylaminobenzylidene)-dodecylamine | ++ | ++ | ++ | ++ | ++ | ++ | ++ | ++ |
| N-(4-dimethylaminobenzylidene)-tetradecylamine | ++ | ++ | ++ | ++ | ++ | ++ | ++ | ++ |
| N-[4-(β-diethylaminoethoxy)-benzylidene]-dodecylamine | + | + | + | + | ++ | ++ | + | + |
| N-(4-dimethylaminobenzylidene)-octylamine | + | + | + | + | + | + | + | + |
| N-(4-isopropylbenzylidene)-octylamine | + | + | ++ | ++ | + | + | + | + |
| N-(4-isopropylbenzylidene)-n-propylamine [1] | — | — | + | + | — | + | — | — |
| N-(4-isopropylbenzylidene)-n-butylamine [1] | — | — | + | + | — | + | — | — |
| N-(2,4-dichlorobenzylidene)-butylamine [2] | — | — | — | + | — | — | — | — |
| N-(3,4-dichlorobenzylidene)-butylamine [2] | — | — | — | + | — | — | — | — |

[1] Known from U.S. Patent 2,914,560. [2] Known from U.S. Patent 2,920,101.

The fungicidal action of active substance, falling under Formula I has further been tested on *Uromyces appendiculatus* on beans (*Phaseolus vulgaris*). This test is carried out as follows:

*Uromyces appendiculatus* on beans (*Phaseolus vulgaris*)

Leaves of bean plants (*Phaseolus vulgaris*) in the two-leaf stage were sprayed with an aqueous suspension containing 0.1% of active substance, which is obtained from the 10% wettable powder described as form for application above, by dilution with water. A plot of control plants is left unsprayed.

After drying, the leaves are infested with a fresh suspension of spores of *Uromyces appendiculatus*. The plants are then left for one day in a moist room and then kept in a green-house. After about 7 to 10 days, the test is evaluated as follows:

0=no attack by fungi
1–9=graduated strength of attack, culminating in
10=total infestation (corresponding to the control plants).

The following results were obtained:

| Compound: | Strength of attack |
|---|---|
| N-(4-methoxycarbonyl-benzylidene)-dodecylamine | a 1 |
| N-(4-n-propylthio-benzylidene)-dodecylamine | 2 | a Plants show very slight leaf burns.

3. A compound as defined in claim 1, which is of the formula

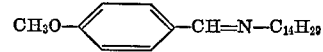

References Cited
UNITED STATES PATENTS

| 3,090,720 | 5/1963 | Kenaga | 260—566 F X Ref |
| 3,466,164 | 9/1969 | DeGaetano et al. | 260—566 F X Ref |
| 2,914,570 | 11/1959 | Robertson | 260—566 F X Ref |

FOREIGN PATENTS

| 979,132 | 1/1965 | Great Britain | 260—566 F |

OTHER REFERENCES

Wright et al.: J. Org. Chem., vol. 11, pp. 111–122 (1946).

Sanferre et al.: J. Am. Chem. Soc., vol. 80, pp. 1254–57 (1958).

Chemical Abstr., vol. 42, col. 3341–42 (1948).

BERNARD HELFIN, Primary Examiner

G. A. SCHWARTZ, Assistant Examiner

U.S. Cl. X.R.

260—465 E, 471 A; 424—304, 309, 325